(12) United States Patent
Martin

(10) Patent No.: US 7,580,700 B2
(45) Date of Patent: Aug. 25, 2009

(54) METHOD OF MANAGING ACCESS TO A RANDOM-ACCESS COMMUNICATION NETWORK

(75) Inventor: Béatrice Martin, Paris (FR)

(73) Assignee: ALCATEL, Paris (FR)

( * ) Notice: Subject to any disclaimer, the term of this patent is extended or adjusted under 35 U.S.C. 154(b) by 323 days.

(21) Appl. No.: 10/568,743

(22) PCT Filed: Jun. 30, 2004

(86) PCT No.: PCT/FR2004/001696

§ 371 (c)(1),
(2), (4) Date: May 31, 2006

(87) PCT Pub. No.: WO2005/025089

PCT Pub. Date: Mar. 17, 2005

(65) Prior Publication Data

US 2006/0215617 A1    Sep. 28, 2006

(30) Foreign Application Priority Data

Aug. 22, 2003    (FR)    ................................ 03 10092

(51) Int. Cl.
*H04B 7/216*    (2006.01)
(52) U.S. Cl. ...................... 455/411; 370/335
(58) Field of Classification Search ................. 455/411; 370/335
See application file for complete search history.

(56) References Cited

U.S. PATENT DOCUMENTS 5,745,484 A    4/1998    Scott 6,298,050 B1 * 10/2001 van Heeswyk et al. ...... 370/335
6,795,701 B1 * 9/2004 Baker et al. .................. 455/411

FOREIGN PATENT DOCUMENTS

EP    0 984 642 A    3/2000
WO    WO 01/08315 A    2/2001

* cited by examiner

*Primary Examiner*—William D Cumming
(74) *Attorney, Agent, or Firm*—Sughrue Mion, PLLC

(57) ABSTRACT

A device (D) is dedicated to communication management in a base station (SB) of a random access communication network. The device comprises processing means (MT) adapted i) to divide time intervals into time slots each associated with an access time slot during which a terminal (UE) is able to send an access request to the network and of width equal to the duration of an access request, ii) to divide said time intervals into sub-intervals (SI) including at least two consecutive time slots, iii) to designate in each sub-interval (SI) at least one prohibited time slot associated with a prohibited access time slot, iv) to define in each sub-interval (SI) a number, at least equal to the number of time slots that it contains, of windows (F) offset in time and of width equal to that of a time slot, and v), in the event of reception of an access request sent by a requesting terminal (UE), to deduce from the window (F) to which the access request belongs at least one access delay of the requesting terminal relative to a reference and then to determine from the access delay the time of sending an acknowledgement message to said requesting terminal (UE) so that it is able to receive it in a predefined acknowledgement time slot.

31 Claims, 3 Drawing Sheets

METHOD OF MANAGING ACCESS TO A RANDOM-ACCESS COMMUNICATION NETWORK

BACKGROUND OF THE INVENTION

The invention relates to the field of random access communication networks, and more particularly to managing communications within such networks.

In certain networks of the type cited above, for example networks including slotted ALOHA access, communication terminals can transmit their messages only during times authorized by the network.

To be more precise, when it first accesses the network, a requesting terminal must transmit to the base station signals representing a preamble defining a request for access with a view to transmitting a message. To this end, it transmits the preamble with a signature selected at random from N signatures (N=16 in the case of a UMTS network, for example), in a specific random access channel (RACH), and in an access time slot of predefined width. In a slotted ALOHA type network the preamble has a duration equal to 4096 chips, for example, and the width of a time slot is equal to 5120 chips (which corresponds to 1.3 ms).

Each terminal has a map of the access slots during which it is authorized to send its preambles. This map, which is configurable, is broadcast periodically over the whole of the coverage area of the network, to all the terminals situated in that area. Moreover, the time reference of the base station is broadcast periodically by the network over the whole of the coverage area to all of the terminals situated in that area over a dedicated synchronization channel.

The requesting terminal can send the message associated with the transmitted preamble only if said preamble has been acknowledged by the network, more precisely by the base station. If the requesting terminal has not received an acknowledgement message within a predefined and configurable acknowledgement time, it sends another preamble in an access slot. The number of preambles that can be sent consecutively and the period with which the preambles are sent are predefined and configurable. They are broadcast periodically by the network over the whole of the coverage area to all the terminals situated in that area.

A preamble is said to be acknowledged when the base station has determined the presence of the terminal that sent it and the terminal has received an acknowledgement message from the base station within the acknowledgement time cited above.

In the above type of network the time reference (or base) that is broadcast, for example by a satellite, is received by the various terminals present in the coverage area of that satellite, with a delay relative to a reference that depends on their respective positions in the area. Each terminal must lock its timebase onto the time reference of the network. Now, because of the spread of the propagation times between the satellite and the receiver modules of the terminals, the latter are not synchronized with each other. The spacing between the authorized access slots is therefore selected to define a guard time.

If the spread of propagation times is less than or equal to the guard time, the preambles sent by the various terminals over different access time intervals are received by the base station within time slots that correspond to the access time slots without risk of offsetting and/or overlapping.

On the other hand, if the spread of the propagation times is greater than the guard time, the preambles sent by different terminals over different access time slots are received by the base station offset relative to the receive windows associated with the access time slots. This can happen if the coverage area is enlarged, for example in the case of "spot satellite" type coverage. The offset may be so great that the preambles may be received out of order. For example, in the case of a European spot coverage, the spread of propagation times over round trip paths concerning satellites at an elevation from 20° to 40° can reach 13 ms, which corresponds to an offset of approximately ten access time slots. In the case of a national spot coverage, this spread can reach 4 ms, which corresponds to an offset of approximately three access time slots.

These offsets are liable to increase the risk of collision between preambles, i.e. the probability that the base station receives more than one preamble in the same access time slot. In the above example, this is reflected in a change from slotted ALOHA type access to ALOHA type access, for the receive part, and consequently in a reduction of access capacity. Moreover, because of these offsets the receive time windows of the base station, which are locked to its time reference and of the same width as the access time slots, are no longer suitable.

To eliminate this problem, and more precisely to take account of the spread of propagation times, it has been proposed to define receive time windows extending over a plurality of access time slots. This solution has a number of drawbacks, however. A plurality of preambles received in the same receive time window might not be distinguished although they do not overlap (and therefore there is no collision). Moreover, because of the increased width of the receive time windows, the samples that constitute the signals defining the preambles received in a receive time window must be stored in a buffer for longer, which introduces an additional processing delay. Finally, the calculation time is increased, with no possibility of parallel calculation.

SUMMARY OF THE INVENTION

An object of the invention is therefore to improve on this situation.

To this end it proposes a communication management method for a random access communication network, consisting in:

dividing time intervals into time slots each associated with an access time slot during which a terminal can send an access request to the network, and of selected width greater than or equal to the duration of an access request (or preamble) and then divide those time intervals into sub-intervals including at least two consecutive time slots and prohibit the terminals from sending access requests during at least one of the access time slots associated with the time slots of each sub-interval at the same time as authorizing them to do so during non-prohibited access time slots, defining in each sub-interval a number, at least equal to the number of time slots that it contains, of processing time windows offset in time and of width substantially equal to that of a time slot, and deducing from the window to which a received access request belongs at least one access delay of the requesting terminal relative to a reference and then sending an acknowledgement message to that requesting terminal at a moment selected as a function of that access delay so that it can receive it in a predefined acknowledgement time interval.

The method of the invention may have other features and in particular, separately or in combination:

the reception time of the message transmitted by a terminal consecutively to the reception of an acknowledgement message sent in response to an access request associated with said message may be deduced from the access delay;

the access delay may be stored in corresponding relationship to an identifier of the requesting terminal so as to be able to time the reception of each message sent by the terminal;

the number of time slots of a sub-interval may be selected so that it corresponds to the maximum spread of the access delays of the terminals in a coverage area of the network. For example, the number of time slots of a sub-interval may be equal to three and the use of two consecutive time slots of three time slots in each sub-interval may be prohibited;

at least certain of the processing time windows may have a common limit and/or certain of the processing time windows have a time overlap, for example approximately equal to 50%;

the time interval is equal to n times the duration of a radio frame constituting the message associated with an access request, n being greater than or equal to 1; for example, n is equal to 2;

signals representing the access requests may be received in parallel over each of the processing time windows of the sub-intervals so as to deduce in parallel respective windows to which the received signals belong from the access delays of the requesting terminals relative to the reference, after which acknowledgement messages are sent to the requesting terminals at times selected as a function of their respective access delays, so that they are able to receive them in the predefined acknowledgement time interval;

signals representing the access requests may be received throughout the duration of each sub-interval and an access delay may be associated with each access request received during the sub-interval as a function of the processing time window during which it was received, after which acknowledgement messages may be sent to the requesting terminals at times selected as a function of their respective access delays so that they can receive them in the predefined acknowledgement time interval.

The invention also proposes a communication management device for a base station of a random access communication network, comprising processing means adapted to:

divide time intervals into time slots each associated with an access time slot during which a terminal is able to send an access request to the network and of selected width greater than or equal to the duration of an access request, divide the time intervals into sub-intervals including at least two consecutive time slots, designate in each sub-interval at least one time slot associated with a prohibited access time slot during which the terminals are prohibited from sending their access requests to the network, define in each sub-interval a number, at least equal to the number of time slots that it contains, of processing time windows offset in time and of width substantially equal to that of a time slot, and in the event of reception of an access request sent by a requesting terminal, deduce from the window to which the access request belongs at least one access delay of the requesting terminal relative to a reference and then to determine from the access delay a time of sending an acknowledgement message to the requesting terminal so that it is able to receive it in a predefined acknowledgement time slot.

The device of the invention may have other features and in particular, separately or in combination:

processing means adapted to determine from the access delay the time of receiving the message sent by a terminal consecutively to the receipt of an acknowledgement message sent in response to an access request associated with the message;

a memory adapted, on the instructions of the processing means, to store each deduced access delay in corresponding relationship to an identifier of the requesting terminal; in this case, the processing means are adapted to instruct the receive timing of the base station to be locked to each message sent by a terminal as a function of the access delay associated with its identifier in the memory;

a number of time slots of a sub-interval selected so that it corresponds to the maximum spread of the access delays of the terminals situated in a coverage area of the network;

processing means adapted to define at least certain of the processing time windows so that pairs of them have a common limit and/or a time overlap, for example approximately equal to 50%;

processing means adapted to receive signals representing the access requests in parallel over each of the processing time windows of the sub-intervals so as to deduce in parallel respective windows to which the received signals belong from the access delays of the requesting terminals relative to the reference, and then to command the sending of acknowledgement messages to the requesting terminals at delays selected as a function of their respective access delays, so that they are able to receive them in the predefined acknowledgement time interval;

processing means adapted to receive signals representing the access requests throughout the duration of each sub-interval and then to associate an access delay with each access request received during the sub-interval as a function of the processing time window during which it was received, and then to command the sending of acknowledgement messages to the requesting terminals at times selected as a function of their respective access delays so that they can receive them in the predefined acknowledgement time interval.

The invention also relates to a base station (or gateway) for a random access communication network equipped with a communication management device of the type outlined above.

The invention is particularly well adapted, although not exclusively so, to managing calls of 3G type communication terminals, for example UMTS type 3G communication terminals operating in frequency division duplex (FDD) mode. Also, the invention is particularly well suited to communication networks including one or more communication satellites or relay stations or radio repeaters, possibly of satellite type, connected to a base station and causing much spreading of signal propagation times.

BRIEF DESCRIPTION OF THE DRAWINGS

Other features and advantages of the invention will become apparent on reading the following detailed description and examining the appended drawings, in which.

The appended drawings constitute part of the description of the invention as well as contributing to the definition of the invention, if necessary.

Figure 4:
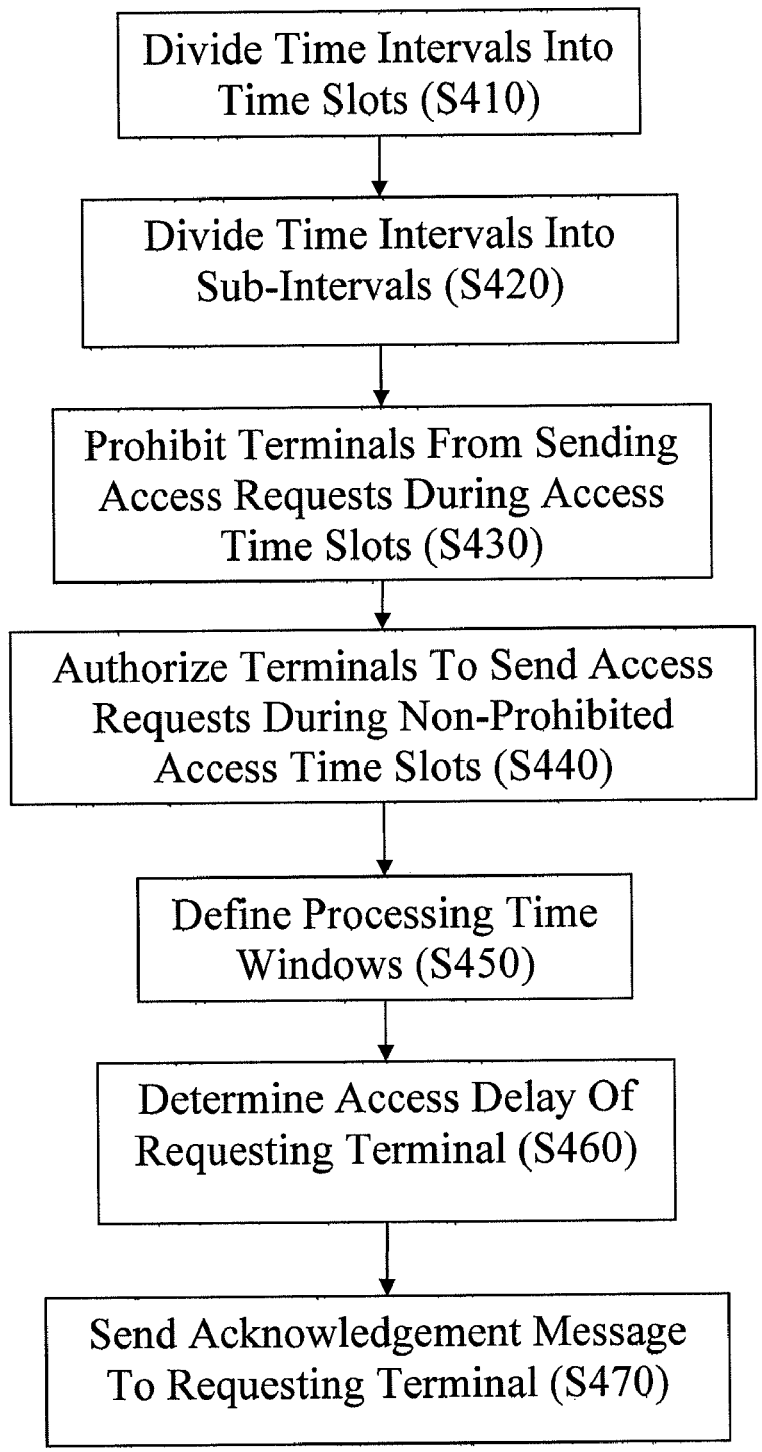

FIG. 4 is a flowchart of a method according to an exemplary embodiment of the present invention.

DETAILED DESCRIPTION OF EXEMPLARY EMBODIMENTS OF THE INVENTION

An object of the invention is to enable adaptation of random access to a communication network with one or more large coverage areas.

The following description considers, by way of illustrative example, a satellite type communication network with a slotted ALOHA type access mechanism, as outlined in the introduction. However, the invention is not limited to that type of network alone. It relates to all communication networks subject to a high spread (or divergence) of signal propagation times and which communication terminals can access using a random access procedure based on sending a preamble during access time slots. Accordingly, the invention also relates to communication networks including relay stations or radio repeaters, possibly of satellite type, inducing high spreading of signal propagation times.

In the present context, the expression "communication terminal" refers to any network equipment, and in particular any user equipment, such as a fixed or portable computer, a mobile telephone or a personal digital assistant (PDA), or any server, capable of exchanging data in the form of signals either between themselves via the network to which they are connected or with said network.

Moreover, it is considered hereinafter, by way of illustrative example, that the terminals are mobile telephone type user equipments (UE) connected to a 3G type communication network, such as a UMTS network, and operating in frequency division duplex (FDD) mode.

Figure 1:
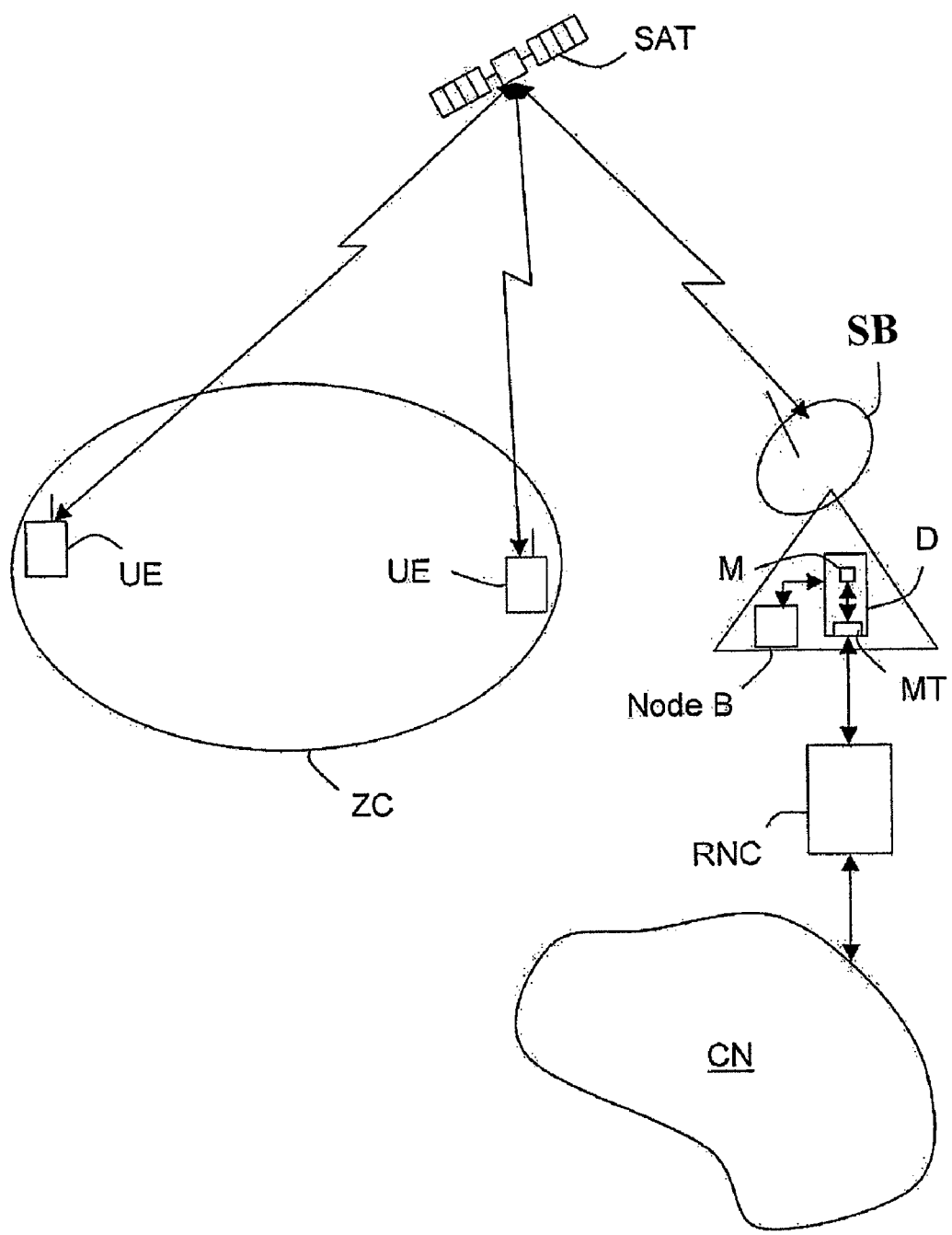
FIG. 1 is a diagram of one embodiment of a portion of a satellite communication network including a base station equipped with a device of the invention.

As shown in FIG. 1, a UMTS network with satellite access may, very broadly speaking but nevertheless in sufficient detail for the invention to be understood, be summarized as a core network (CN) coupled to an access network.

The satellite access network includes, firstly, at least one satellite base station SB (or gateway) connected to the core network CN by an access node called the radio network controller (RNC) and integrating a Node B of the UMTS network and, secondly, at least one satellite SAT adapted to exchange data by radio with the satellite base station SB and with user equipments UE, such as mobile telephones, equipped with a satellite transceiver. The satellite link constitutes a satellite interface. Also, as the RNC has both service and control functions, it is called the controlling and serving RNC.

The Node B processes the signal in the base station SB. It is associated with one or more cells each covering a radio area containing one or more user equipments UE. The cell(s) of a Node B integrated into a satellite base station SB are in the coverage area ZC of the satellite SAT associated with that satellite base station SB. Here the coverage area ZC is large, as in the case of what the person skilled in the art knows as a spot satellite, for example.

In this type of satellite network, as indicated in the introduction, when a terminal UE wishes to communicate a message containing data, it must, when it first accesses the network, send an access request (or preamble) to the satellite base station SB, referred to hereinafter as the gateway. To this end, the terminal UE generates a preamble accompanied by a signature which, in the case of slotted ALOHA type access, extends over a period of N chips, for example N=4096 chips. In the case of a UMTS network, the signature is chosen at random from 16 signatures.

The terminal UE then transmits the preamble in the form of radio signals to the satellite SAT covering the cell in which it is located, using a dedicated random access channel (RACH) and in an authorized access time slot. The satellite SAT then transmits the signed preamble to the gateway SB. The gateway SB must then execute a mechanism for acknowledging the received access request (or preamble) consisting firstly in deducing from the time slot during which it receives the preamble the access time slot used by the requesting terminal UE and then deduce the access delay from the access time slot used.

In the present context, the expression "access delay" refers to the time needed for an access request (or preamble) generated by a terminal UE to reach the gateway SB via all the intermediate elements of the satellite access network (Node B and SAT, and their respective connection interfaces).

The access delay varying as a function of the position of the requesting terminal UE in the coverage area ZC, a preamble sent by two distant terminals UE in the same access time slot T will be received by the gateway SB in different (offset) receive time intervals. Now, in a network with slotted ALOHA type access, each receive time interval corresponds to an access time slot, which corresponds to a fixed access delay. Consequently, in a large coverage area ZC, the preambles sent by terminals UE in the vicinity of its boundary may be received in receive time intervals that do not correspond to the access time slot used, which may, on reception, generate preamble collisions that prevent the acknowledging of those preambles.

The invention is intended to remedy this drawback.

To this end it proposes a communication management device D installed in the gateway SB and primarily comprising a processing module MT, as shown in FIG. 1.

The processing module MT is firstly responsible for dividing time intervals IT into an integer number of time slots whose width is made equal to the duration of an access time slot T. Hereinafter, the access time slots T used by the terminals UE to transmit their preambles (or access requests) are lumped together with the time slots resulting from the division of the intervals IT. Each time slot T therefore has a width greater than or equal to the duration of a preamble (or access request). Remember that the width of a time slot is equal to 5120 chips (which corresponds to 1.3 ms), while the width of a preamble is equal to 4096 chips, for example.

Figure 2:
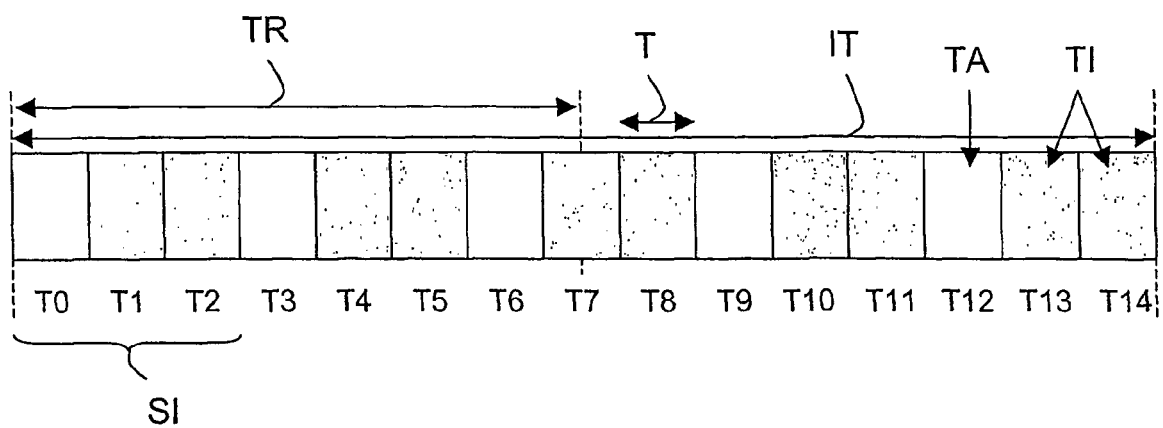
FIG. 2 is a diagram of one example of the division of a time interval (IT) into time slots (T, TA and TI) and into sub-intervals (SI) of three time slots.
Figure 3:
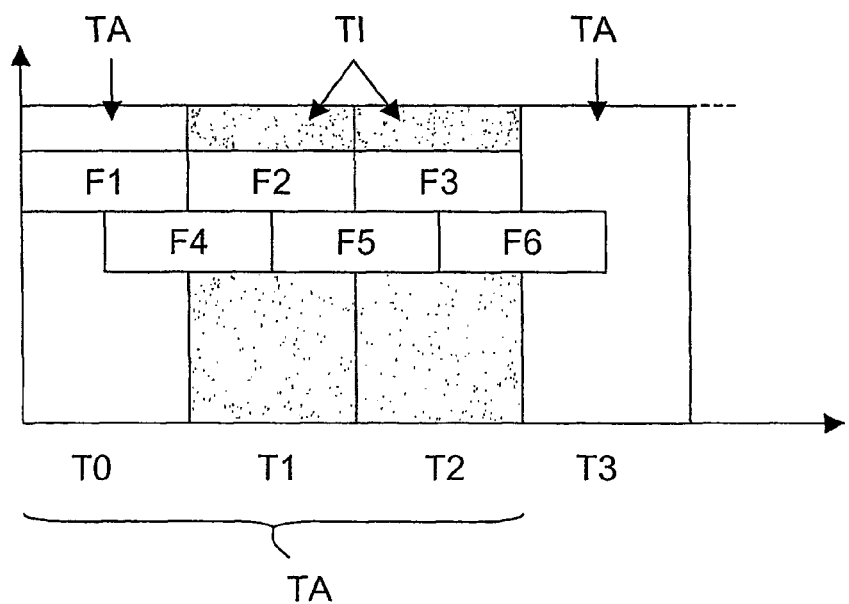
FIG. 3 is a diagram of one example of the definition of processing time windows for the acquisition (or reception) in parallel of signals defining network access request preambles.

As shown in FIG. 2, in the case of a UMTS network, each time interval IT has the maximum duration of a message, which is 20 ms. In fact, a message may spread over one or two radio frames TR each of 10 ms duration. Each time slot T of a time interval IT has a width of 1.3 ms, so a 20 ms time interval IT can therefore be divided into 15 time slots (T0 to T14).

Once this division has been effected, the processing module MT divides each time interval IT into sub-intervals SI including at least two consecutive time slots T. In the FIG. 2 example, each sub-interval SI includes three time slots T.

The processing module MT then designates in each sub-interval SI at least one prohibited time slot TI corresponding to an access time slot during which the terminals UE are prohibited from sending their preambles (or access requests) to the network. The time slots T whose use is not prohibited are called authorized time slots TA. They correspond to the access time slots during which the terminals UE are authorized to send their preambles to the network. In the FIG. 2 example, each sub-interval SI includes a first authorized time slot TA followed by two prohibited time slots TI. However, other arrangements may be envisaged, of course.

The number of time slots T constituting a sub-interval SI, the number of prohibited time slots TI and the number of authorized time slots TA in each sub-interval SI are chosen to cover the maximum spread of delays over the coverage area ZC concerned.

The information concerning the duration of the access time slots, the map of the access time slots, i.e. the authorized time slots TA and the prohibited time slots TI, the signatures, the minimum waiting time between two preamble sendings in the absence of reception of an acknowledgement message (or acknowledgement time interval), the delay between sending an acknowledged preamble and sending the associated message, and the maximum number of preambles that may be sent consecutively are broadcast periodically, in the conventional way, by the gateway SB, via the access network, to the terminals UE situated in the coverage area ZC of the satellite SAT.

Once this designation has been effected, the processing module MT defines in each sub-interval SI a selected number of processing time windows F having a width substantially equal to that of a time slot T and offset in time. The number of processing time windows F per sub-interval SI is at least equal to the number of time slots T that said sub-interval SI contains. In the FIG. 2 multiwindowing example, six processing windows (F1 to F6) are defined in each sub-interval SI. To be more precise, in this example, three windows (F1 to F3) have a common limit and each extends over a time slot T, and three windows (F4 to F6) each extend over two halves of time slots T. The window F4 extends over the time slots T0 and T1, the window F5 extends over the time slots T1 and T2, and the window F6 extends over the time slots T2 and T3. In other words, in this example, the window F4 has a 50% overlap with the windows F1 and F2, the window F5 has a 50% overlap with the windows F2 and F3, and the window F6 has a 50% overlap with the window F3 and with the window F1 of the next sub-interval SI.

Of course, other processing time window F arrangements may be envisaged, with or without overlap.

The processing module MT therefore has a plurality of processing (or reception) windows offset in time but associated with an authorized access time slot TA, so that it is able to receive in the various windows all of the preambles sent in the authorized access time slot TA regardless of their respective access delays. In the FIG. 2 example, the windows F4 to F6 that overlap the windows F1 to F3 are intended to increase the chances of detection, but above all to increase the accuracy of detection.

When the processing module MT receives a preamble (or access request) sent by a requesting terminal UE, it is able to deduce from the window in which it was received (or detected) the access delay of the requesting terminal UE relative to a time reference. That time reference corresponds, for example, to the minimum network access delay of a terminal UE situated in the coverage area ZC concerned. For example, the first window F1 corresponds to the time reference and therefore to the minimum access delay, whereas the window F3 or F6 corresponds to the maximum access delay (i.e. that which exhibits the widest spread).

Once the processing module MT has deduced the access delay of a preamble, it is able to determine, from that access delay and from the predefined waiting time between two preamble sendings (broadcast periodically), the moment at which the gateway SB will have to transmit to the requesting terminal UE the message acknowledging the preamble for said terminal UE to receive it during the predefined waiting time.

That transmission time is of course defined relative to the time reference (or base) of the gateway SB.

Once the processing module MT has determined an acknowledgement message transmission time, it preferably determines, from the associated access delay, the time at which it will receive from the terminal UE the message that it must transmit consecutively to receiving the acknowledgement message.

That reception time is defined relative to the time reference (or base) of the gateway SB, of course.

The processing module MT preferably stores each access delay previously deduced in a memory M of the device D in corresponding relationship to the identifier of the corresponding requesting terminal UE.

That enables the processing module MT to instruct its gateway SB to lock its receiver onto each message that a given terminal UE is liable to send subsequently, given the access delay that is associated with its identifier in the memory M.

The mechanism for determining the access delay(s) may be implemented in at least two different ways.

The first way is well suited to multiwindowing with overlap as shown in FIG. 2. Here, the processing module MT receives (or acquires) in parallel over each processing time window F defined in a sub-interval SI signals representing access requests. It can therefore, in parallel, determine the access delays corresponding to the preambles received in the various processing time windows F and instruct the gateway SB to send acknowledgement messages to the requesting terminals UE at times corresponding to their respective access delays. This reduces the processing times and increases the access capacity of the gateway SB (and therefore of the network).

The second way does not allow parallel processing. The processing module MT receives (or acquires) the signals representing preambles (or access requests) throughout the duration of a sub-interval SI, noting their respective arrival times. When the sub-interval has ended, it uses the definition of its processing time windows F to determine to which window F each preamble received during said sub-interval SI belongs. It can then associate an access delay with each preamble received during the sub-interval SI as a function of the processing time window during which it was received. The processing module MT can then instruct the gateway SB to send acknowledgement messages to requesting terminals UE at times corresponding to their respective access delays in order for them to be able to receive them in the acknowledgement time interval previously defined.

In either event, there is restored at least the capacity to receive over all of the time slots associated with the authorized access time slots TA, despite the large time spreads induced by the size of the coverage area ZC. Thus the invention enables a W-CDMA type radio interface to be used as an IMT-2000 type satellite interface (in particular of the 3GPP UMTS type in FDD mode).

The management device D of the invention, and in particular its processing module PM, and where applicable its memory M, may take the form of electronic circuits, software (or electronic data processing) modules, or a combination of circuits and software.

The invention also provides a communication management method for a random access communication network.

This method may in particular be implemented with the aid of the management device D and the base station (or gateway)

SB described hereinabove. The main and optional functions and sub-functions of the steps of the method being substantially identical to those of the various means constituting the management device D and/or the base station (or gateway) SB, only the steps implementing the main functions of the method of the invention are summarized hereinafter.

With reference to FIG. 4, the method consists in:
dividing time intervals IT into time slots T (S410) each associated with an access time slot during which a terminal UE can send an access request to the network, and of selected width greater than or equal to the duration of an access request (or preamble) and then divide those time intervals IT into sub-intervals SI (S420) including at least two consecutive time slots T and prohibit the terminals UE from sending access requests during at least one of the access time slots TI (S430) associated with the time slots T of each sub-interval SI at the same time as authorizing them to do so during non-prohibited access time slots TA (S440), defining in each sub-interval SI a number, at least equal to the number of time slots T that it contains, of processing time windows F (S450) offset in time and of width substantially equal to that of a time slot T, and deducing from the window F to which a received access request belongs at least one access delay of the requesting terminal UE relative to a reference (S460) and then sending an acknowledgement message (S470) to that requesting terminal UE at a moment selected as a function of that access delay so that it can receive it in a predefined acknowledgement time interval.

The invention is not limited to the management device, base station and management method embodiments described hereinabove by way of example only, and encompasses all variants that the person skilled in the art might envisage that fall within the scope of the following claims.

Thus the foregoing description refers to a random access satellite communication network equipped with one or more satellite base stations (or gateways). The invention is not limited solely to this type of random access network, however. It relates to all random access communication networks in which there is a large spread (or divergence) of signal propagation times between a base station (or gateway) and communication terminals, and in particular communication networks including relay stations or radio repeaters, possibly of the satellite type, connected to a base station.

The invention claimed is:

1. A communication management method for a random access communication network, the method comprising:
by a gateway of the random access communication network, dividing time intervals into time slots each associated with an access time slot during which a terminal can send an access request to the network, and of selected width greater than or equal to the duration of an access request and then divide those time intervals into sub-intervals including at least two consecutive time slots and prohibit the terminals from sending access requests during at least one of the access time slots associated with the time slots of each sub-interval at the same time as authorizing them to do so during non-prohibited access time slots, defining in each sub-interval a number, at least equal to the number of time slots that said sub-interval contains, of processing time windows offset in time and of width substantially equal to that of a time slot, and deducing from the window to which a received access request belongs at least one access delay of the requesting terminal relative to a reference and then sending an acknowledgement message to that requesting terminal at a moment selected as a function of that access delay so that said requesting terminal can receive said acknowledgement message in a predefined acknowledgement time interval.

2. The method according to claim 1, wherein a reception time of a message transmitted by a terminal consecutively to the reception of an acknowledgement message sent in response to an access request associated with said message is deduced from said access delay.

3. The method according to claim 1, wherein said access delay is stored in corresponding relationship to an identifier of the requesting terminal so as to be able to time the reception of each message sent by said terminal.

4. The method according to claim 1, wherein said number of time slots of a sub-interval is selected so that said sub-interval corresponds to the maximum spread of the access delays of the terminals in a coverage area of said network.

5. The method according to claim 1, wherein said number of time slots of a sub-interval is equal to three.

6. The method according to claim 5, wherein the use of two consecutive time slots of three time slots in each sub-interval is prohibited.

7. The method according to claim 1, wherein at least certain of said processing time windows have a common limit.

8. The method according to claim 1, wherein certain of said processing time windows have a time overlap.

9. The method according to claim 8, wherein said time overlap is substantially equal to 50%.

10. The method according to claim 1, wherein said time interval is equal to n times the duration of a radio frame constituting said message associated with an access request, n being greater than or equal to 1.

11. The method according to claim 1, wherein signals representing said access requests are received in parallel over each of the processing time windows of the sub-intervals so as to deduce in parallel respective windows to which said received signals belong from the access delays of the requesting terminals relative to said reference, after which acknowledgement messages are sent to said requesting terminals at times selected as a function of their respective access delays, so that said requesting terminals are able to receive said acknowledgement messages in said predefined acknowledgement time interval.

12. The method according to claim 1, wherein signals representing said access requests are received throughout the duration of each sub-interval and an access delay is associated with each access request received during said sub-interval as a function of the processing time window during which said access request was received, after which acknowledgement messages are sent to said requesting terminals at times selected as a function of their respective access times so that said requesting terminals can receive said acknowledgement messages in said predefined acknowledgement time interval.

13. A communication management device for a base station of a random access communication network, the communication management device comprising:
a processing means which:
divides time intervals into time slots each associated with an access time slot during which a terminal is able to send an access request to the network and of selected width greater than or equal to the duration of an access request,
divides said time intervals into sub-intervals including at least two consecutive time slots,
designates in each sub-interval at least one prohibited time slot associated with an access time slot during which the terminals are prohibited from sending their access requests to the network, defines in each sub-interval a number, at least equal to the number of time slots that said sub-interval contains, of processing time windows offset in time and of width substantially equal to that of a time slot, and in the event of reception of an access request sent by a requesting terminal, deduces from the window to which said access request belongs at least one access delay of the requesting terminal relative to a reference and then to determine from said access delay a time of sending an acknowledgement message to said requesting terminal so that said requesting terminal is able to receive said acknowledgement message in a predefined acknowledgement time slot; and a memory which stores the at least one access delay deduced by the processing means.

14. The device according to claim 13, wherein said processing means determines from said access delay a time of receiving a message sent by a terminal consecutively to the receipt of an acknowledgement message sent in response to an access request associated with said message.

15. The device according to claim 13, wherein the memory, on the instructions of said processing means, stores each deduced access delay in corresponding relationship to an identifier of the requesting terminal and said processing means instructs the receive timing of said base station to be locked to each message sent by a terminal as a function of the access delay associated with an identifier of the terminal in said memory.

16. The device according claim 13, wherein said number of time slots of a sub-interval is selected so that said sub-interval corresponds to the maximum spread of the access delays of the terminals situated in a coverage area of said network.

17. The device according to claim 13, wherein said number of time slots of a sub-interval is equal to three.

18. The device according to claim 17, wherein said processing means designates on command two consecutive prohibited access time slots of three time slots in each sub-interval.

19. The device according to claim 13, wherein said processing means defines at least certain of said processing time windows so that pairs of said processing windows have a common limit.

20. The device according to claim 13, wherein said processing means defines at least certain of said processing time windows so that said processing time windows have a time overlap.

21. The device according to claim 20, wherein said time overlap is substantially equal to 50%.

22. The device according to claim 13, wherein said time interval is equal to n times the duration of a radio frame constituting said message associated with an access request, n being greater than or equal to one.

23. The device according to claim 13, wherein said processing means receives signals representing said access requests in parallel over each of the processing time windows of the sub-intervals so as to deduce in parallel respective windows to which said received signals belong from the access delays of the requesting terminals relative to said reference, and then to command the sending of acknowledgement messages to said requesting terminals at times selected as a function of said requesting terminals respective access delays, so that said requesting terminals are able to receive said acknowledgement messages in said predefined acknowledgement time interval.

24. The device according to claim 13, wherein said processing means receives signals representing said access requests throughout the duration of each sub-interval and then to associate an access delay with each access request received during said sub-interval as a function of the processing time window during which said access request was received, and then to command the sending of acknowledgement messages to said requesting terminals at times selected as a function of said requesting terminals respective access delays so that said requesting terminals can receive said acknowledgement messages in said predefined acknowledgement time interval.

25. A base station for a random access communication network, comprising a communication management device, wherein said communication management device comprises a processing means which:

divides time intervals into time slots each associated with an access time slot during which a terminal is able to send an access request to the network and of selected width greater than or equal to the duration of an access request, divides said time intervals into sub-intervals including at least two consecutive time slots, designates in each sub-interval at least one prohibited time slot associated with an access time slot during which the terminals are prohibited from sending their access requests to the network, defines in each sub-interval a number, at least equal to the number of time slots that said sub-interval contains, of processing time windows offset in time and of width substantially equal to that of a time slot, and in the event of reception of an access request sent by a requesting terminal, deduces from the window to which said access request belongs at least one access delay of the requesting terminal relative to a reference and then to determine from said access delay a time of sending an acknowledgement message to said requesting terminal so that said requesting terminal is able to receive said acknowledgement message in a predefined acknowledgement time slot.

26. The method according to claim 1, wherein the random access communication network is a third generation (3G) communication network having a 3G communication terminal.

27. The method according to claim 26, wherein said 3G communication terminal is a UMTS 3G communication terminal operating in frequency duplex mode.

28. The method according to claim 26, wherein said random access communication network includes a satellite.

29. The method according to claim 26, wherein said random access communication network is a random access communication networks including a radio relay station coupled to a base station.

30. The device according to claim 13, wherein the random access communication network is a third generation (3G) communication network having a 3G communication terminal.

31. The base station according to claim 25, wherein the random access communication network is a third generation (3G) communication network having a 3G communication terminal.

* * * * *

UNITED STATES PATENT AND TRADEMARK OFFICE
CERTIFICATE OF CORRECTION

PATENT NO.        : 7,580,700 B2                                        Page 1 of 1
APPLICATION NO. : 10/568743
DATED             : August 25, 2009
INVENTOR(S)      : Béatrice Martin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 507 days.

Signed and Sealed this

Fourteenth Day of September, 2010

David J. Kappos
*Director of the United States Patent and Trademark Office*